US010062204B2

(12) United States Patent
Di Censo et al.

(10) Patent No.: US 10,062,204 B2
(45) Date of Patent: Aug. 28, 2018

(54) VIRTUAL THREE-DIMENSIONAL INSTRUMENT CLUSTER WITH THREE-DIMENSIONAL NAVIGATION SYSTEM

(71) Applicant: Harman International Industries, Incorporated, Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 411 days.

(21) Appl. No.: 14/139,101

(22) Filed: Dec. 23, 2013

(65) Prior Publication Data

US 2015/0178985 A1 Jun. 25, 2015

(51) Int. Cl.
| | | |
|---|---|---|
| *G06T 15/00* | (2011.01) | |
| *G06T 17/05* | (2011.01) | |
| *B60K 37/02* | (2006.01) | |
| *B60K 35/00* | (2006.01) | |
| *G01C 21/36* | (2006.01) | |

(52) U.S. Cl.
CPC .............. *G06T 17/05* (2013.01); *B60K 35/00* (2013.01); *B60K 37/02* (2013.01); *G01C 21/3635* (2013.01); *B60K 2350/1064* (2013.01); *B60K 2350/1072* (2013.01); *B60K 2350/1096* (2013.01); *B60K 2350/2017* (2013.01)

(58) Field of Classification Search
CPC ............ G06T 17/05; B60K 35/00; B60R 1/00

USPC ................... 345/419, 156; 348/148; 340/970
See application file for complete search history.

(56) References Cited

U.S. PATENT DOCUMENTS

| 6,498,620 | B2 * | 12/2002 | Schofield et al. ............ 348/148 |
|---|---|---|---|
| 6,917,693 | B1 * | 7/2005 | Kiridena ................... B60R 1/00 348/E7.086 |
| 7,126,579 | B2 * | 10/2006 | Ritter ............................. 345/156 |
| 8,094,189 | B2 * | 1/2012 | Kumon .................. B60K 35/00 348/115 |
| 8,521,411 | B2 * | 8/2013 | Grabowski et al. ........... 701/532 |
| 8,643,508 | B2 * | 2/2014 | Turner ........................... 340/970 |

(Continued)

FOREIGN PATENT DOCUMENTS

| CN | 1559055 A | 12/2004 |
|---|---|---|
| CN | 101236454 A | 8/2008 |

(Continued)

OTHER PUBLICATIONS

Hudelmaier, Unified Functions Instrument Cluster, Infotainment and Fleet Management Features, Human machine Interface, ATZ elektronik, Apr. 2012, pp. 10-13.*

(Continued)

*Primary Examiner* — Phu K Nguyen
(74) *Attorney, Agent, or Firm* — Artegis Law Group, LLP

(57) ABSTRACT

System, method, and computer program product to perform an operation, the operation comprising generating a three-dimensional graphical output comprising: a three-dimensional representation of a vehicle instrument cluster comprising a plurality of instruments at a first depth level, and a three-dimensional representation of a navigation system map at a second depth level, and outputting the three-dimensional graphical output for display on a three-dimensional display in a vehicle.

20 Claims, 14 Drawing Sheets

(56) References Cited

U.S. PATENT DOCUMENTS

| | | |
|---|---|---|
| 2008/0068399 A1 | 3/2008 | Goss et al. |
| 2009/0005961 A1 | 1/2009 | Grabowski et al. |
| 2011/0093778 A1 | 4/2011 | Kim et al. |
| 2011/0209079 A1 | 8/2011 | Tarte et al. |
| 2012/0001773 A1 | 1/2012 | Lyons et al. |

FOREIGN PATENT DOCUMENTS

| | | |
|---|---|---|
| CN | 102037326 A | 4/2011 |
| CN | 102589565 A | 7/2012 |
| CN | 103158618 A | 6/2013 |
| CN | 105517834 A | 4/2016 |
| JP | 2004182092 A1 | 7/2004 |
| WO | 2015032766 A1 | 3/2015 |

OTHER PUBLICATIONS

Phillips et al, A Novel Stereoscopic Cue for figure-ground Segregation of Semi-Transparent Objects, GRASP Laboratory, University of Pennsylvania, pp. 1-8, 2011.*

Su et al, Disambiguating Stereoscopic Transparency using a Thaumatrope Approach, IEEE, 2015, pp. 1-12.*

Extended European Search Report for Application No. 14199701.5, dated Sep. 19, 2016, 9 pages.

Hudelmaier, P., "Funktionen vereint—Kombiinstrument, Infotainment und Flottenmanagement", Atz Elektronik, Apr. 2012, pp. 258-261.

* cited by examiner

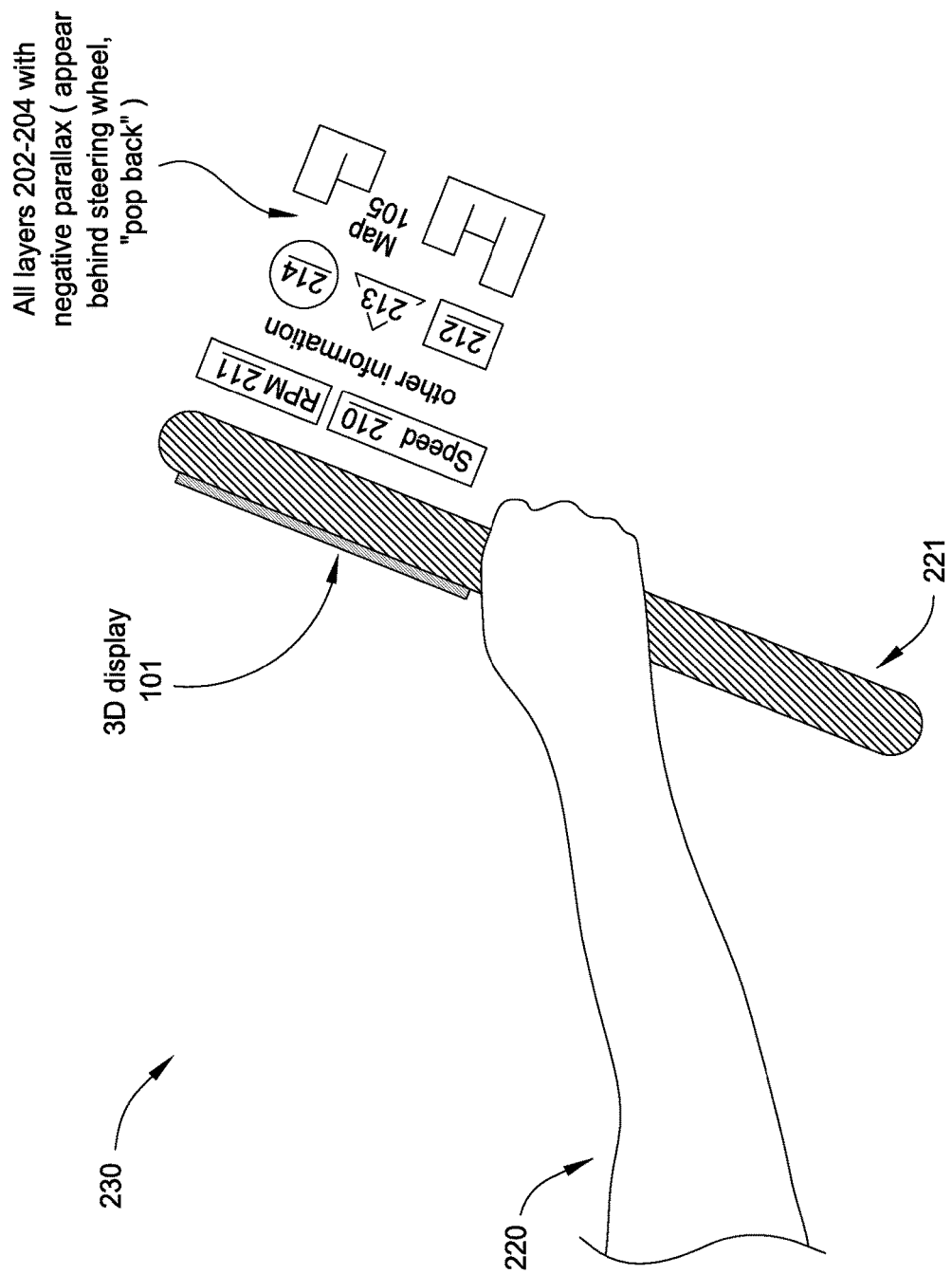

VIRTUAL THREE-DIMENSIONAL INSTRUMENT CLUSTER WITH THREE-DIMENSIONAL NAVIGATION SYSTEM

BACKGROUND

Traditionally, vehicle instrument clusters include a variety of mechanical and digital elements that output information in two dimensions. These instrument clusters cannot be modified by the user, and their positions remain static, making it difficult for drivers to see some instruments at important times.

SUMMARY

Embodiments disclosed herein include a system, method, and computer program product to perform an operation, the operation comprising generating a three-dimensional graphical output comprising: a three-dimensional representation of a vehicle instrument cluster comprising a plurality of instruments at a first depth level, and a three-dimensional representation of a navigation system map at a second depth level, and outputting the three-dimensional graphical output for display on a three-dimensional display in a vehicle.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIGS. 2A-2C are schematic illustrations of a system with a virtual three-dimensional instrument cluster and three-dimensional navigation system, according to various embodiments of the present invention.

DETAILED DESCRIPTION

Figure 1:
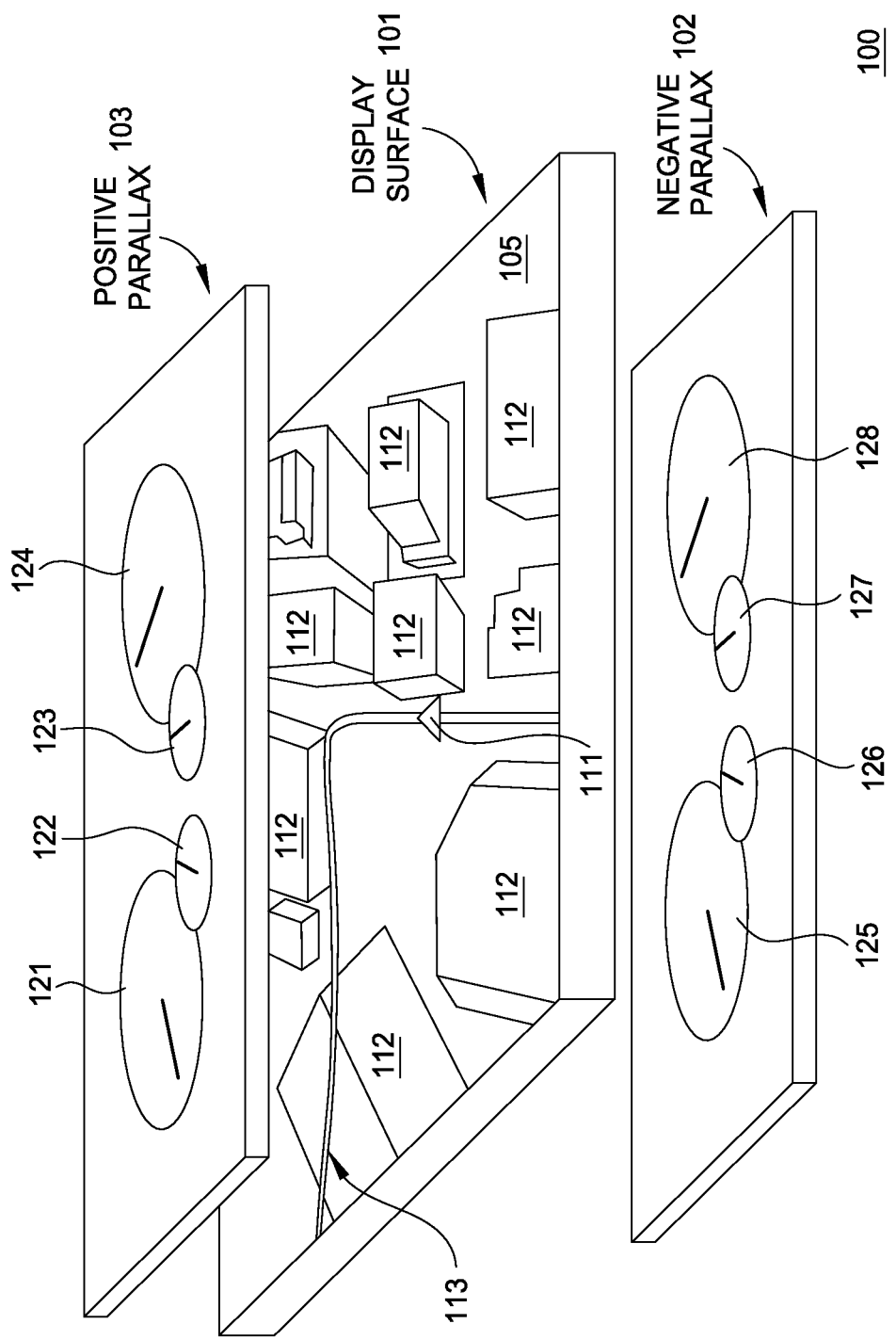
FIG. 1 is a schematic illustration of an enhanced user interface in a vehicle, according to various embodiments of the present invention.

Embodiments disclosed herein provide a three-dimensional rendering of an instrument control panel and a three-dimensional rendering of a third-person-view navigation system on a view-dependent, stereoscopic, parallax-enabled three-dimensional display (referred to herein as a "3D display") in a vehicle. The system may output the instrument control panel such that it appears closer to the driver, while outputting the navigation system at a depth further away from the driver, providing a "see-through" instrument control panel on top of the 3D navigation system. However, a user can control the depth positioning of each layer, such that the 3D rendering of the navigation system, its notification elements, and one or more of the elements in the instrument control panel appear closer to or further away from the driver's face. The user can control the depth positioning by any feasible method, including physical controllers, sliders, buttons, or digital settings on the 3D display (or a center console display). Additionally, each user may define a set of preferences indicating preferred placement, ordering, and appearance of different items displayed on the 3D display.

Furthermore, the system can adjust the layering order and modify different 3D elements at appropriate times. For example, and without limitation, a "right turn" notification may gradually move from a bottom-most layer to a top-most layer nearest to the driver, as the driver approaches the point where the right turn should be taken. As another example, and without limitation, if a driver's speed exceeds the current speed limit, the system may modify the 3D rendering of the speedometer by moving it closer to the driver's face and giving the speedometer additional emphasis (such as a different color or bolder shading) to note the importance of the speedometer given the current driving context. A "driving context," as used herein, refers to a context used to identify one or more elements or layers displayed on the 3D display that should be moved or altered in any way. The driving context may include, but is not limited to, the vehicle's speed, the vehicle's location, an attribute or state of the vehicle (such as gas levels, fluid levels, or tire pressure), applicable laws or regulations at the vehicle's location, weather conditions, triggering events, and the like. In other embodiments, the system may detect a focus of the user's eyes and move an instrument the driver is looking at closer to the driver's face. For example, and without limitation, if the system determines that the driver is looking at a tachometer, the system may move the tachometer closer to his face.

All items output for display on a three-dimensional display include a depth (or z-axis) component. The Figures, being two-dimensional recreations of the three-dimensional output generated by a 3D display, may not adequately capture the depth, or z-axis of the three-dimensional output, and should not be considered limiting of the disclosure.

FIG. 1 is a schematic illustration of an enhanced user interface 100 in a vehicle, according to various embodiments of the present invention. As shown, the enhanced user interface 100 includes, without limitation, a 3D display 101 that outputs a three dimensional navigation system 105 and a 3D instrument control panel at a negative parallax level 102 and positive parallax level 103. In some embodiments, the 3D display 101 is a stereoscopic, parallax enabled, viewpoint dependent three-dimensional display (also referred to as the 3D display) in a vehicle. The stereoscopic feature of the 3D display 101 allows viewers to see images with three-dimensional depth similarly to real objects by delivering two different images per frame, one image for the right eye, and one image for the left eye. The images for each eye may be slightly different in order to convey the difference in perception from the two eyes. In at least some embodiments, the 3D display 101 has at least a 120 Hz refresh rate.

The 3D display 101 also provides viewpoint dependent rendering that allows for more realistic 3D perception of the images displayed by accounting for the user's current point of view when generating output. In order to implement viewpoint dependent rendering, user-facing sensors (not shown) track the viewer's head and/or eyes in order to deliver a three-dimensional rendering of the objects from the viewer's current perspective. Therefore, when the viewer moves his head or eyes, the output of the 3D display 101 is altered based on the viewer's current viewing perspective. The user-facing sensors may be connected to computer vision software (local or remote) for scene analysis and head tracking. The user facing sensors can be mounted inside or outside of the vehicle as long as they face the user. A single sensor, multiple sensors, or sensors mounded on a pan-tilted assembly whose orientation is controlled by the system described herein may be used. The parallax motion effect of the three-dimensional display 101 conveys to the viewer the feel of a real object's depth, where objects closer to the viewer appear to move faster than objects farther away when moving sideways.

In one embodiment, a user wears 3D glasses (not shown) in order to decode the stereoscopic images (one for the left eye, and one for the right eye) and view the enhanced user interface 100. The glasses may be any type of 3D glasses, including passive or active, shutter based or polarized, and the like. The 3D glasses, having different lenses for the left and right eye, allow only the image intended for each eye to be delivered to the eye. Therefore, the glasses only delivery the image for the right eye to the right eye only, and the image for the left eye to the left eye only. In one embodiment, the 3D display 101 may be used without glasses based on lenticular overlays. One example, without limitation, of a 3D display solution with glasses and user-facing sensors is The zSpace® System by zSpace, Inc.®

As shown, the 3D display 101 displays a three-dimensional navigation system 105 in a vehicle. The navigation system 105 includes, without limitation, a map reflecting a position of the vehicle 111 along navigation route 113 as well as a plurality of three-dimensional buildings 112 in the area around the vehicle. When the driver moves his head or eyes, the navigation system map 105 may change to match the driver's new perspective. As shown, a positive parallax 103 of the enhanced user interface 100 includes a set of instrument controls 121-124. The positive parallax 103, output by the 3D display 101, appears closer to a viewer (the driver), than the navigation system 105 on the display surface 101, or the negative parallax 102. The negative parallax 102 of the enhanced user interface 100, also output by the 3D display 101, includes another set of instrument controls 125-128. The negative parallax 102 and the corresponding set of instrument controls 125-128 appear to the user at a depth below the instrument controls 121-124 and the three-dimensional navigation system 105 map. Although the enhanced user interface 100 includes the negative parallax 102 and positive parallax 103, the 3D display is configured to output any number of different layers having a positive and negative parallax, and the particular output depicted in FIG. 1 should not be considered limiting of the disclosure.

The instrument controls 121-128 may comprise any type of vehicle instrument control, such as a speedometer, tachometer, fuel gauge, or pressure gauge, or any other type of information such as current weather conditions, notifica- tions, messages, emails, SMS messages, and the like. The instrument controls 121-128, as well as the vehicle position 111, the buildings 112, and route 113 each may have different depths, opacities, and other attributes. For example, and without limitation, a multi-story building may appear to come closer to the driver's face than a single-story building, giving a realistic 3D effect. Furthermore, items displayed on the 3D display 101 may change based on the driving context. For example, and without limitation, if the instrument control 121 is a speedometer, it may have a bolder, brighter color than other instrument controls 122-128 when the driver is speeding. Furthermore, any of the items displayed by the 3D display 101 may have different placements and depths. The use of layers, therefore, is merely to facilitate explanation of the disclosure and convey that each item displayed by the 3D display 101 has a depth. Different elements (such as instrument controls 121-128) spanning any number of layers, or depths, may be output by the 3D display 101 as part of the enhanced user interface 100.

Figure 2A:
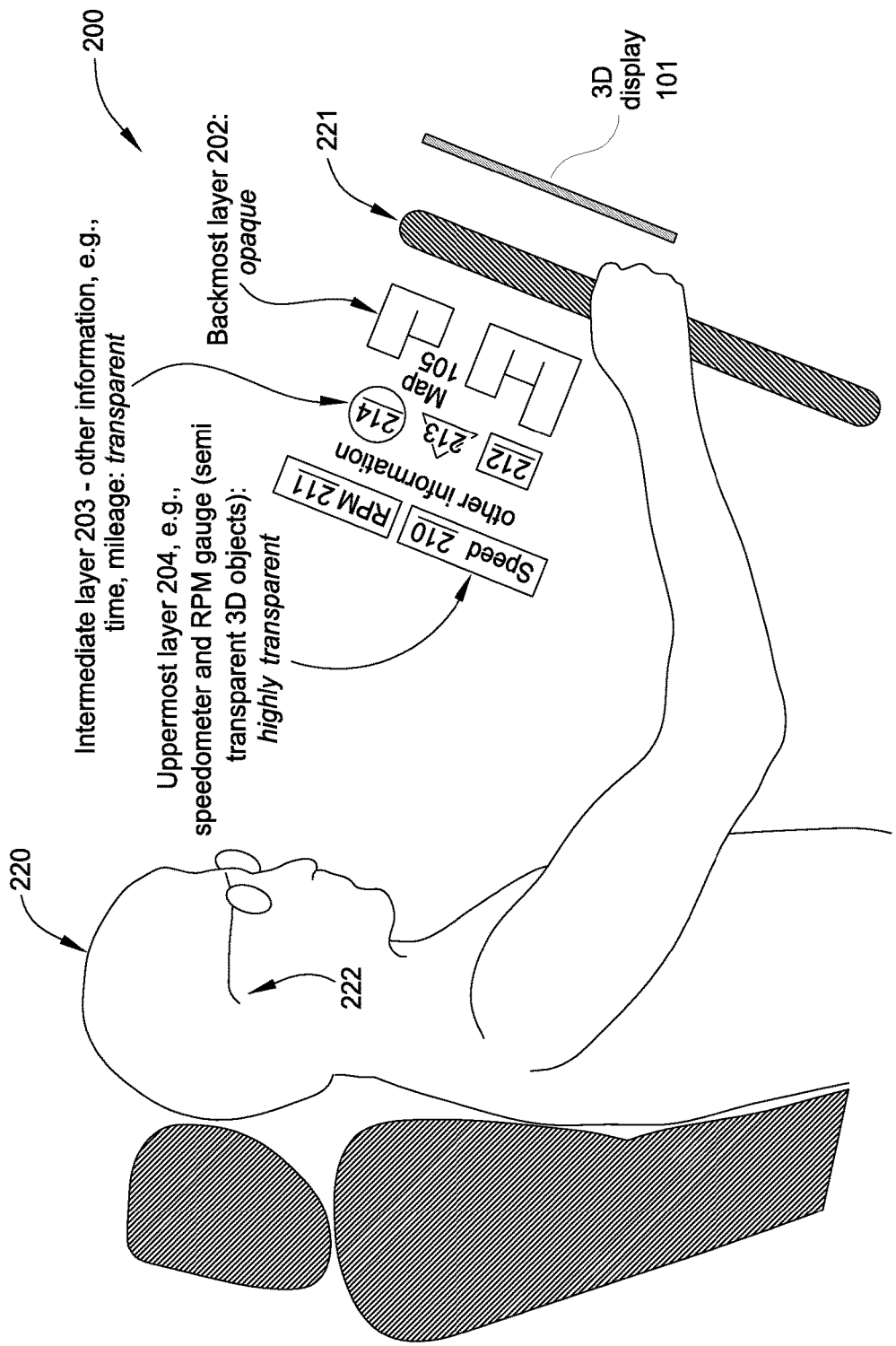

FIG. 2A is a schematic illustration of a system 200 including, without limitation, a virtual three-dimensional instrument cluster including elements 210-214 and three-dimensional navigation system 105, according to various embodiments of the present invention. As shown, a driver 220 is seated at a steering wheel 221 in a vehicle. The driver 220 is wearing 3D glasses 222 to allow the stereoscopic images for each frame to be delivered to the correct eye. The 3D display 101 is positioned behind the steering wheel 221, such as in the vehicle dashboard (not pictured). However, the 3D display 101 may be mounted on the steering wheel 221, or placed in any other location that can be viewed by the driver 220. The 3D display 101 is configured to output information that is seen by the driver 220 at any number of different depth levels. As shown, the 3D display outputs three different layers 202-204, each of which appear to the user 220 as being between the user 220 and the 3D display 101. Each layer has one or more display elements 210-214, and the navigation system 105, rendered by the 3D display 101. Although the system 200 is depicted as including three layers 202-204 and the elements 210-214, the system 200 is capable of outputting any number of elements on any number of layers, and the specific depictions of layers and elements herein should not be considered limiting of the disclosure.

The backmost layer 202, which may be opaque due to its positioning as being furthest away of the three layers from the driver 220, includes the three-dimensional navigation system 105, which includes a number of different elements (such as buildings) that each have their own respective depths. The intermediate layer includes elements 212-214 for other information that is output by the 3D display for the user. For example, and without limitation, the elements 212-214 may include navigation instructions, instrument controls, or other notifications and messages. The elements 212-214 may each have their own appearance and position, and appear to the driver 220 as being between the backmost layer 202 and the uppermost layer 204. The display elements in the intermediate layer 203 may be slightly transparent in order to allow the user to see the navigation system 105 map. The uppermost layer 204 includes a speedometer 210 and a tachometer 211, each of which may take any shape, form, color, or depth. The display elements in the uppermost layer 204 may be highly transparent in order to allow the driver 220 to see the display elements in the intermediate layer 203 and the backmost layer 202. Generally, any number of controls, notifications, and the like can be displayed in each layer 202-204, or across different layers, and the particular configuration depicted in FIG. 2A should not be considered limiting of the disclosure. In addition, user preferences may specify the ordering of the layers 202-204, as well as which elements 210-214 and the navigation system 105 map appear in those layers.

FIG. 2B is a schematic illustration of a system 230 including, without limitation, a virtual three-dimensional instrument cluster including elements 210-214 and three-dimensional navigation system 105, according to various embodiments of the present invention. As shown, FIG. 2B depicts a configuration where the 3D display 101 is mounted on the steering wheel 221. As shown, each layer 202-204 appears to the driver 220 as having a negative parallax, such that they appear behind the steering wheel. Therefore, the speedometer 210, the tachometer 211, the other elements 212-214, and the navigation system map 105 each appear to be behind the steering wheel 221 from the perspective of the driver 220. Although all layers 202-204 appear as having a negative parallax, not all layers are required to have the same amount of negative parallax. For example, some layers (or objects therein) may appear further back than others, while some may appear closer to the driver than others.

Figure 2C:
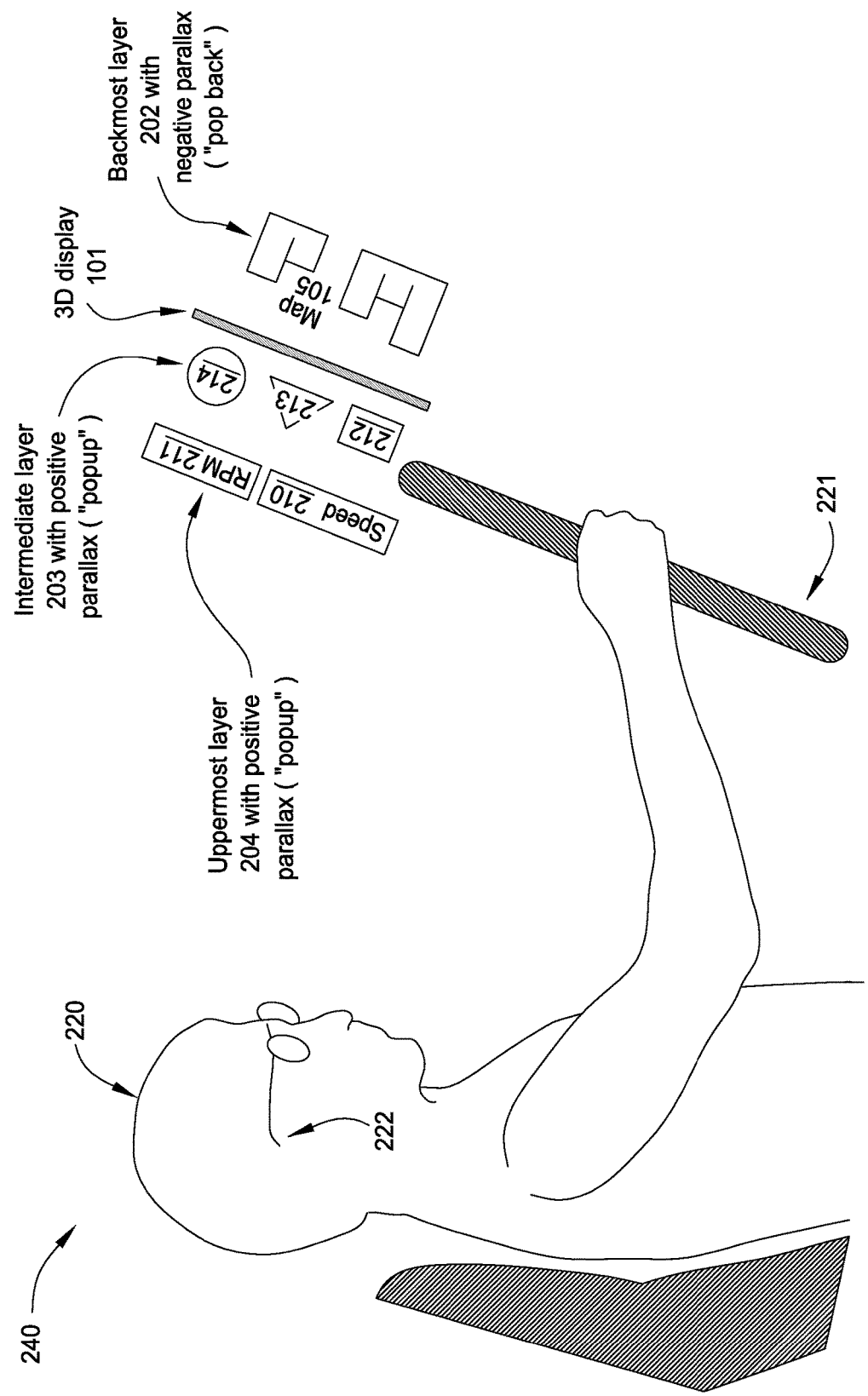

FIG. 2C is a schematic illustration of a system 240 including, without limitation, a virtual three-dimensional instrument cluster including elements 210-214 and three-dimensional navigation system 105, according to various embodiments of the present invention. As shown, FIG. 2C depicts an embodiment where the 3D display 101 is not mounted to the steering wheel, and includes different parallax effects. For example, and without limitation, the navigation system map 105 of layer 202 has a negative parallax effect, such that it appears behind the 3D display 101 from the perspective of the driver 220. The intermediate and uppermost layers 203-204, however, have positive parallax effects, such that the speedometer 210, and tachometer 211, and the other elements 212-214 appear in front of the 3D display 101 from the perspective of the driver 220. Therefore, the 3D display 101 may simultaneously display items with a positive parallax, and items with a negative parallax. Furthermore, the 3D display 101 may also output items that appear as if they are on the surface of the 3D display 101 itself.

Although FIGS. 2A-C depict embodiments where the 3D display 101 is mounted in different positions, the particular hardware configuration and location of the 3D display 101 generally does not control the specific location that objects are rendered from the user's perspective. However, the placement of the 3D display 101 may influence whether rendered objects have a positive or negative parallax effect. For example, and without limitation, if the element 210 needs to be rendered at a distance of 50 centimeters from the user's face, this can be accomplished by software regardless of the physical location of the 3D display 101. If the 3D display 101 is mounted 55 centimeters from the driver's face, the element 210 will have a positive parallax effect. If, however, the 3D display is mounted 40 centimeters from the user's face, the element 210 will have a negative parallax effect. In either scenario, however, the element 210 appears to the driver as if it is 50 centimeters away from his face.

Figure 3A:
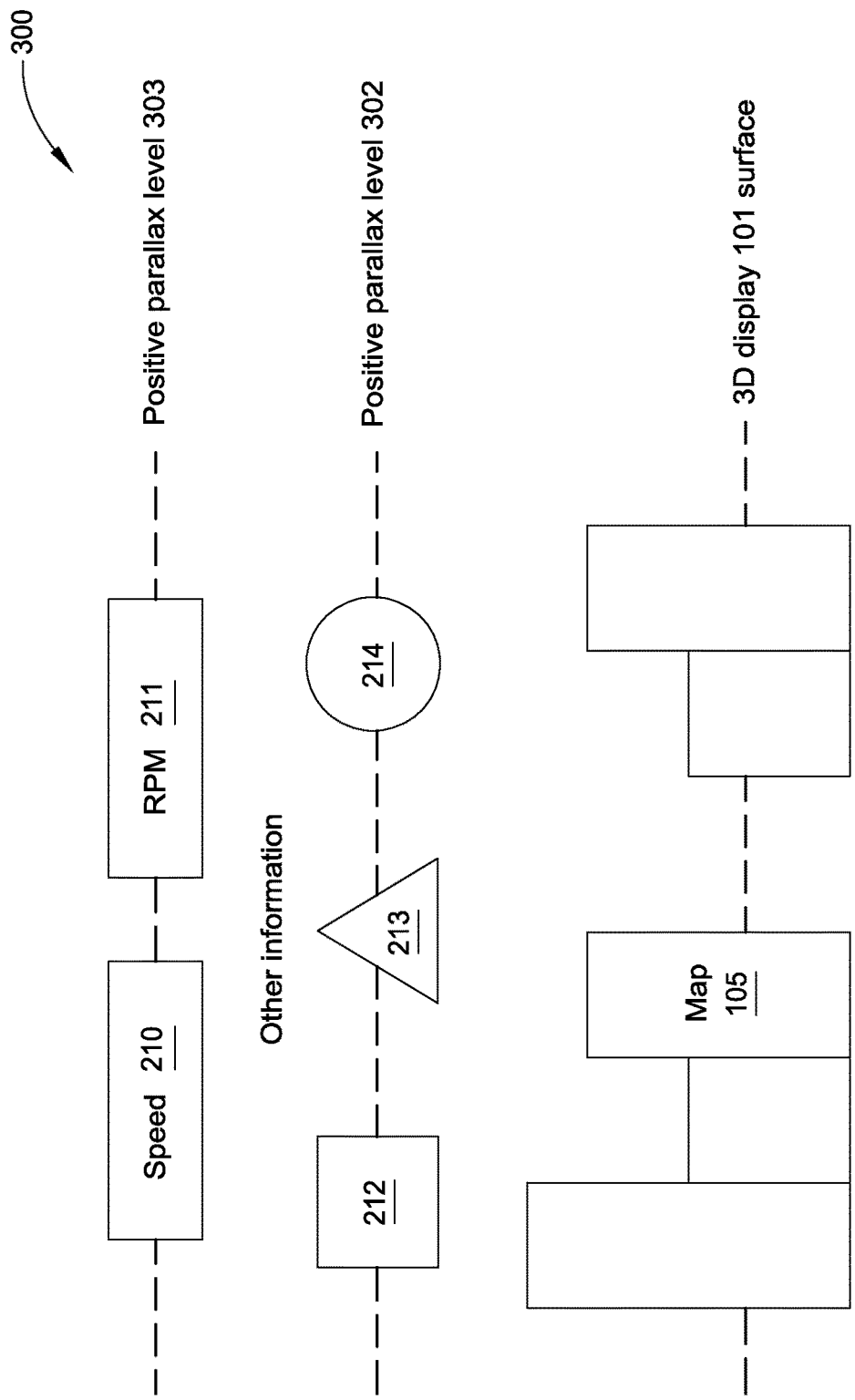
FIGS. 3A-3F are schematic illustrations of a virtual three-dimensional instrument cluster and three-dimensional navigation system, according to various embodiments of the present invention.

FIG. 3A is a schematic illustration of a system 300 including, without limitation, a virtual three-dimensional instrument cluster including elements 210-214 and three-dimensional navigation system 105, according to various embodiments of the present invention. As shown, the 3D display 101 outputs a positive parallax level 303 to include the speedometer 210 and the tachometer 211. The depth of the positive parallax level 303 causes the speedometer and tachometer 211 to appear closest to the driver (not pictured). The 3D display 101 outputs a positive parallax level 302 to include the other elements 212-214 such that they appear below the positive parallax level 303 and above the display surface 101 from the driver's perspective. As shown, the 3D display 101 outputs the navigation system 105 to appear at or near the surface of the 3D display 101. Specifically, the navigation system 105 is shown as appearing both above and below the display surface 101 from the driver's perspective. However, due to changes in the driving context, the focus of the user's eyes, or user input, the 3D display 101 may change the arrangement of the layers, display elements 210-214 and the navigation system 105, or any number of attributes of the display elements 210-214 and the navigations system 105 (for example, and without limitation, the navigation map or notifications). Examples will be discussed in greater detail in reference to FIGS. 3B-3G.

Figure 3B:
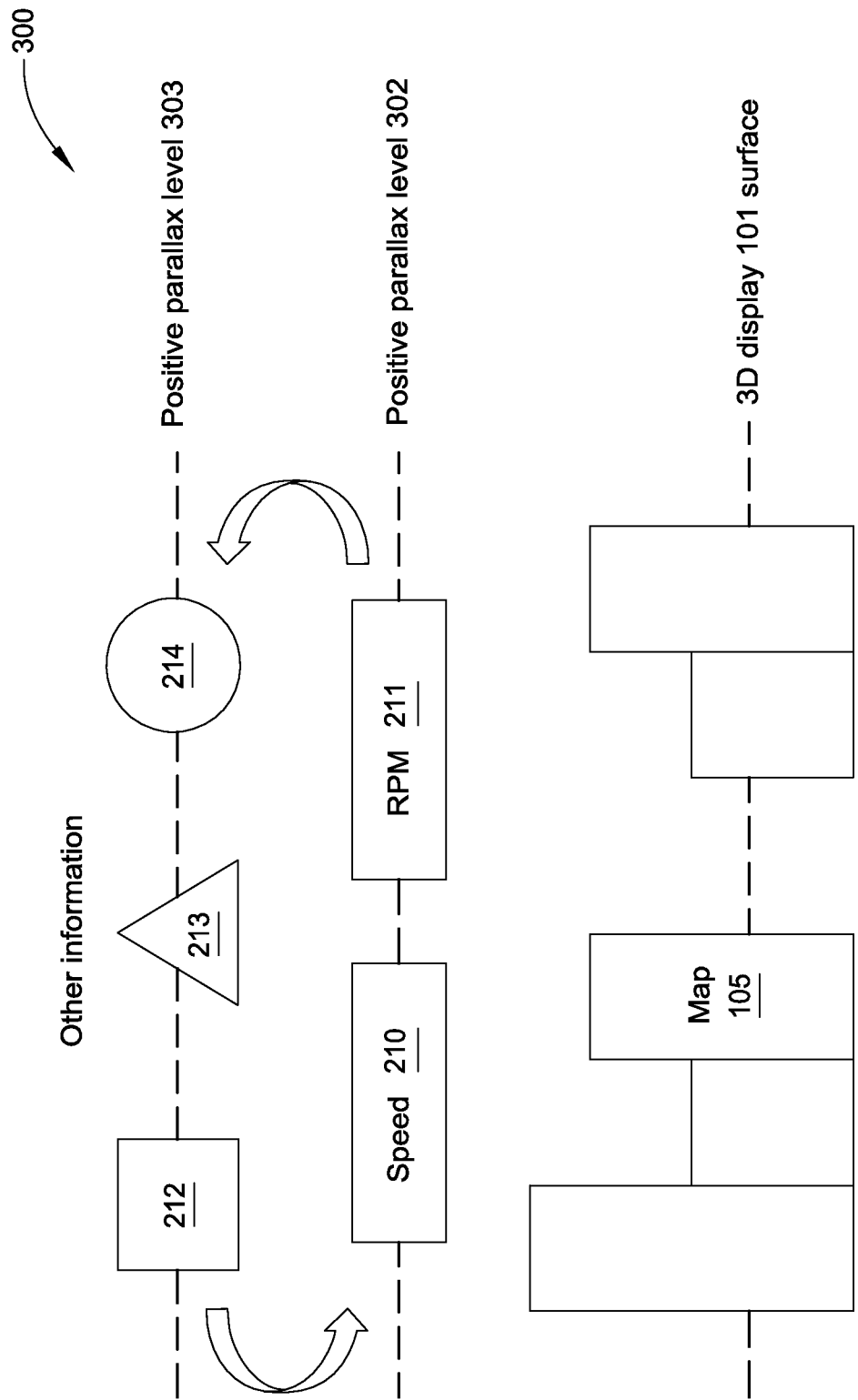

FIG. 3B is a schematic illustration of the system 300 including, without limitation, a virtual three-dimensional instrument cluster including elements 210-214 and three-dimensional navigation system 105, according to various embodiments of the present invention. FIG. 3B generally depicts embodiments where two layers have been swapped. As shown, the 3D display 101 now displays the speedometer 210 and tachometer 211 at positive parallax level 302, while displaying the other elements 212-214 at the positive parallax level 303. The 3D display 101 may swap the layers for any reason, including, but not limited to, user input, a change in the driving context, or the driver's eye focus shifting from the speedometer 210 and tachometer 211 to the elements 212-214. For example, and without limitation, the driver may provide input specifying to swap the layers. As another example, and without limitation, the driver may be driving at a safe speed but his gas tank is nearly empty and two tires are nearly flat. If the elements 212-214 include a fuel gauge and tire pressure gauges, in such a scenario, the 3D display 101 may swap the fuel gauge and the tire pressure gauge with the speedometer 210 and tachometer 211, so that they are closer to the driver in order to capture the driver's attention.

Figure 3C:
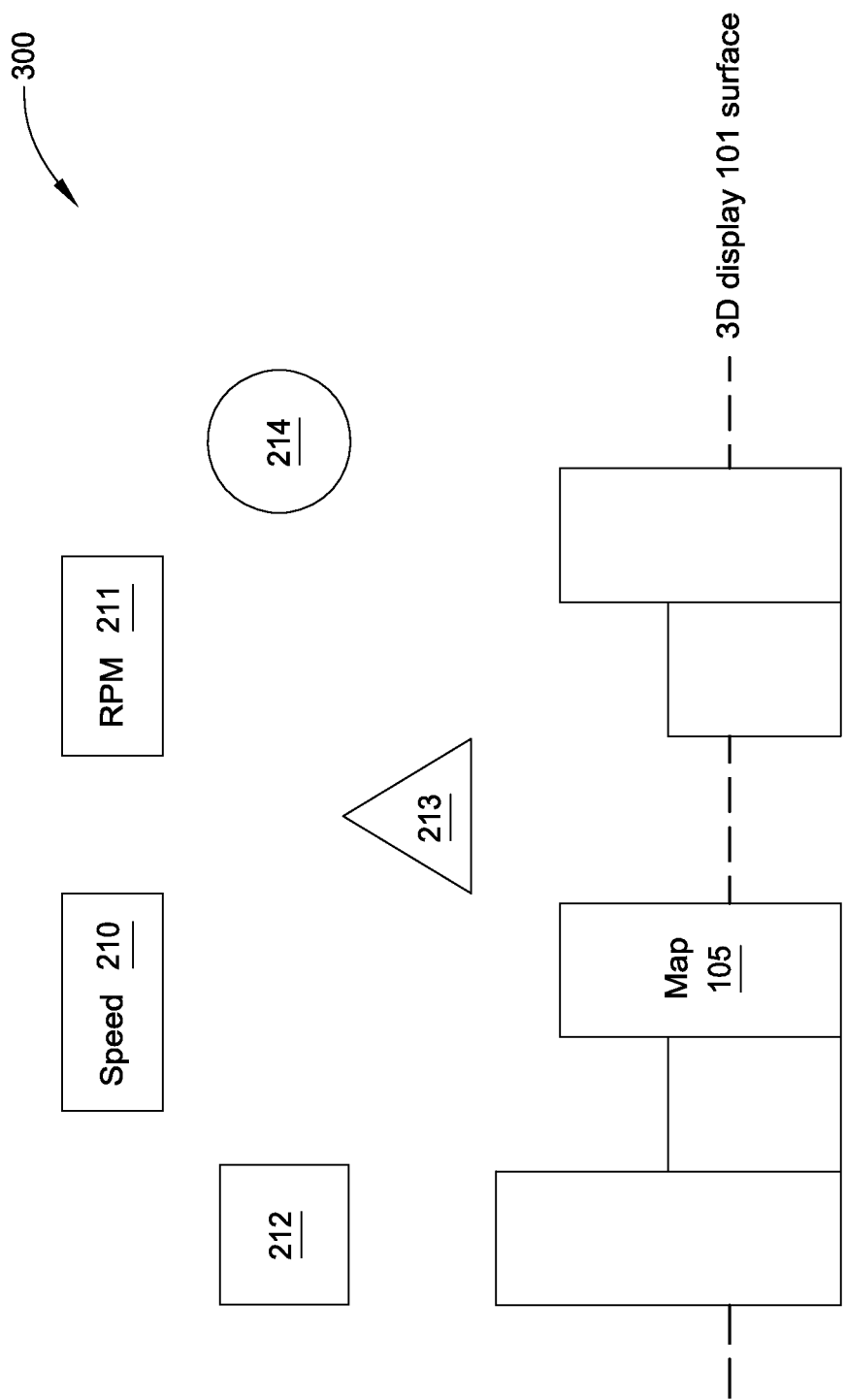

FIG. 3C is a schematic illustration of the system 300 including, without limitation, a virtual three-dimensional instrument cluster including elements 210-214 and three-dimensional navigation system 105, according to various embodiments of the present invention. FIG. 3C depicts an output generated by the 3D display 101 where elements are placed at different depths. As shown, the 3D display 101 outputs the speedometer 210 and tachometer 211 to appear at an equal distance away from the display surface 101. However, the 3D display 101 alters the placement of the other elements 212-214, such that the element 213 appears closer to the display surface than the elements 212, 214. The 3D display 101 outputs the elements 212, 214 to appear at a depth between the speedometer 210 and tachometer 211 and the element 213. The 3D display 101 may output the element 213 at a depth closer to the display surface for any reason. For example, and without limitation, the driver may provide input indicating to push the element 213 further back from his view, or the driving context may indicate that the element 213 is currently of less relevance or importance. In response, the 3D display 101 may alter the placement and appearance of the element 213. In addition, user preferences may influence the placement of different display elements 210-214 and the navigation system map 105. For example, and without limitation, one user may prefer to have the speedometer nearest to her view at all times. As shown, the 3D display 101 again outputs the navigation system map 105 at a positive and negative parallax from the display surface.

Figure 3D:
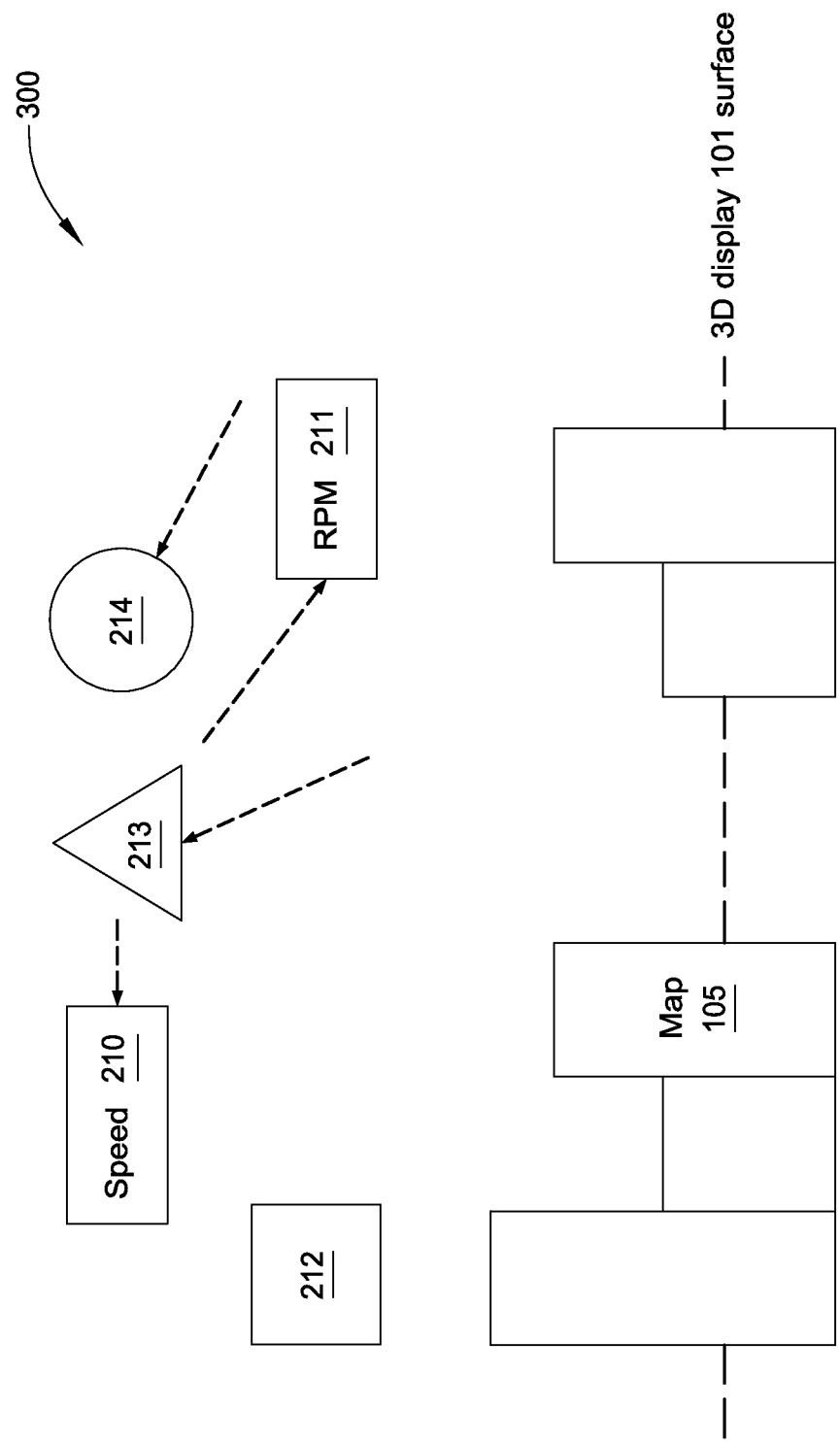

FIG. 3D is a schematic illustration of the system 300 including, without limitation, a virtual three-dimensional instrument cluster including elements 210-214 and three-dimensional navigation system 105, according to various embodiments of the present invention. FIG. 3D depicts a scenario where the display elements are not tied to specific layers, but arranged throughout the 3D display space. As shown, the 3D display 101 has moved the speedometer 210 to the left and the tachometer 211 towards the display surface and to the right. The 3D display has also moved the display elements 213, 214 further away from the display surface (and closer to the driver). The 3D display 101 may move the display elements 213, 214 closer to the driver upon detecting one or more events. For example, and without limitation, if the display element 213 is an instrument displaying engine temperature, and the engine is overheating, the driving context may cause the 3D display 101 to move the display element 213 closer to the driver's face in order to gain the driver's attention. In addition, one or more sensors may detect that the driver's eyes are focusing on the display element 214. In response, the 3D display 101 may output the display element 214 at a position closer to the driver's face in order to facilitate viewing.

Figure 3E:
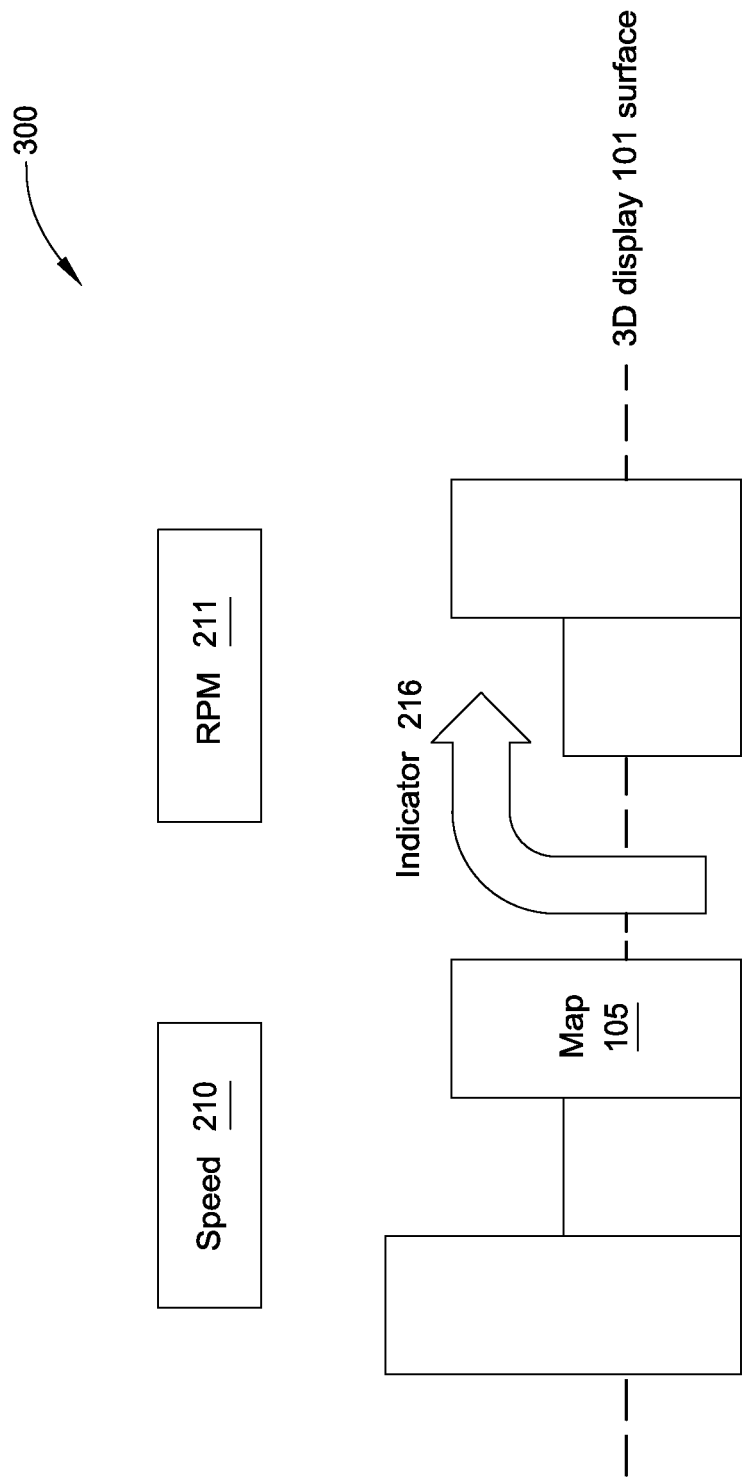

FIG. 3E is a schematic illustration of the system 300 including, without limitation, a virtual three-dimensional instrument cluster including elements 210-214 and three-dimensional navigation system 105, according to various embodiments of the present invention. FIG. 3E depicts a situation where the 3D display 101 outputs a navigation indicator used to instruct the driver during the course of navigation. As shown, the 3D display 101 has rendered a navigation indicator 216 at an initial position near the display surface. The exemplary navigation indicator 216, in this example, is a right turn arrow instructing the driver to turn right. Initially, the indicator 216 appears nearer to the display surface. However, as the vehicle approaches the point where the driver should take the right turn, the 3D display 101 may cause the navigation indicator 216 to move closer to the driver, as well as change the appearance of the navigation indicator 216. For example, and without limitation, as the navigation indicator 216 moves closer to the driver's face, the 3D display may output a more opaque, bolder, or brighter version of the navigation indicator 216.

Although FIG. 3E depicts a scenario where the 3D display 101 does not display the other elements 212-214, in other embodiments, the 3D display 101 may display the other elements 212-214. The 3D display 101 may not display the other elements for any reason, such as to reduce clutter seen by the driver or to allow the driver to more easily notice the navigation indicator 216.

Figure 3F:
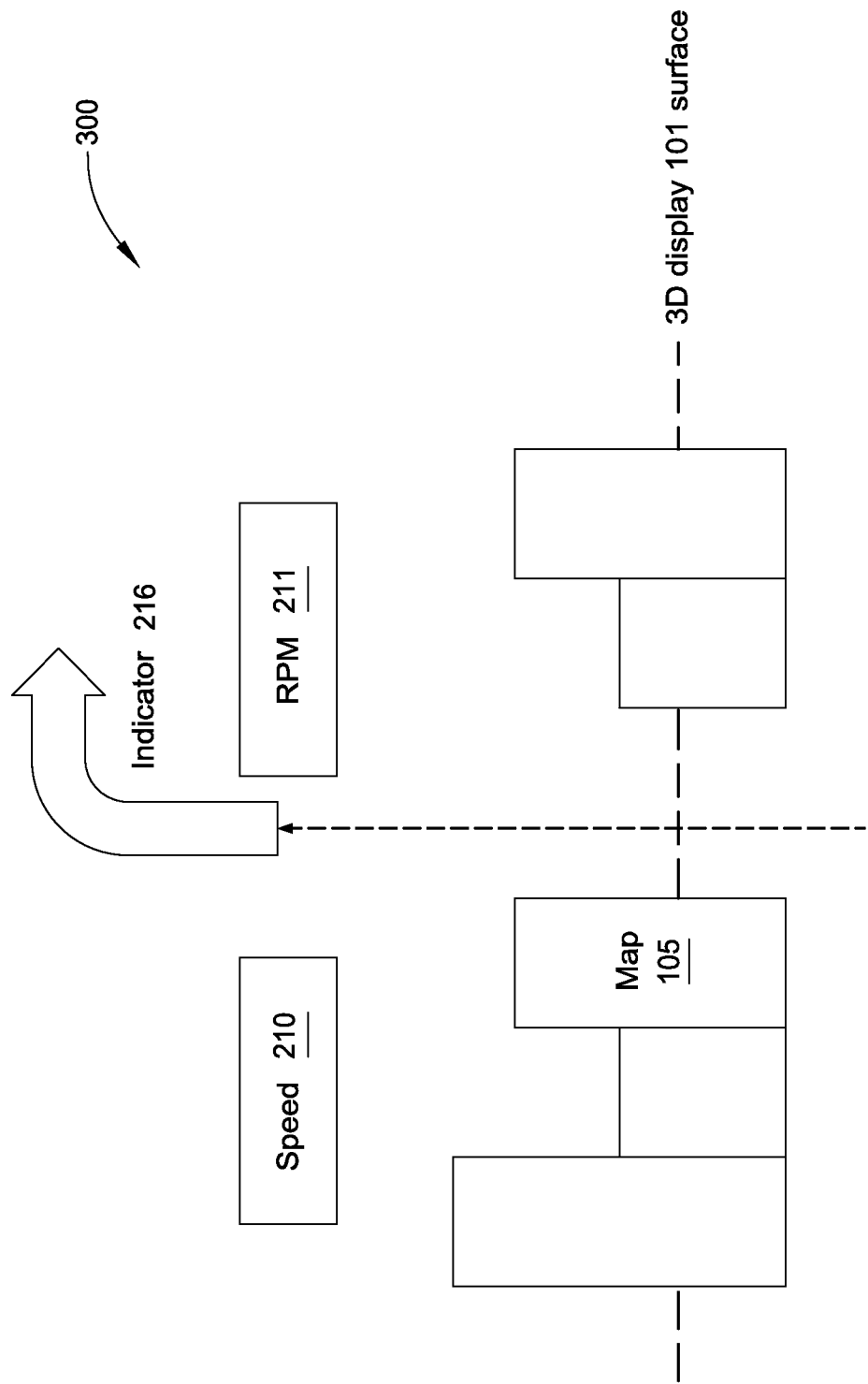

FIG. 3F is a schematic illustration of the system 300 including, without limitation, a virtual three-dimensional instrument cluster including elements 210-214 and three-dimensional navigation system 105, according to various embodiments of the present invention. FIG. 3F reflects a state of the output of the 3D display 101 as the vehicle approaches the point (such as an intersection) where the driver should take a right turn, according to navigation instructions. As shown, the 3D display 101 has gradually moved the navigation indicator 216 from its initial position in FIG. 3E to a position closer to the driver. The 3D display 101 now displays navigation indicator 216 as the closest object to the driver, facilitating the driver's view of the indicator 216, so that the driver does not miss the turn. The indicator 216, as shown, appears in front of the speedometer 210, the tachometer 211, and the navigation system map 105 from the driver's perspective. The color, shading, opacity, and other attributes of the navigation indicator 216 may change as it moves further away from the display surface. For example, and without limitation, the navigation indicator 216 may become larger, bolder, and brighter, in order to capture the driver's attention.

Figure 4:
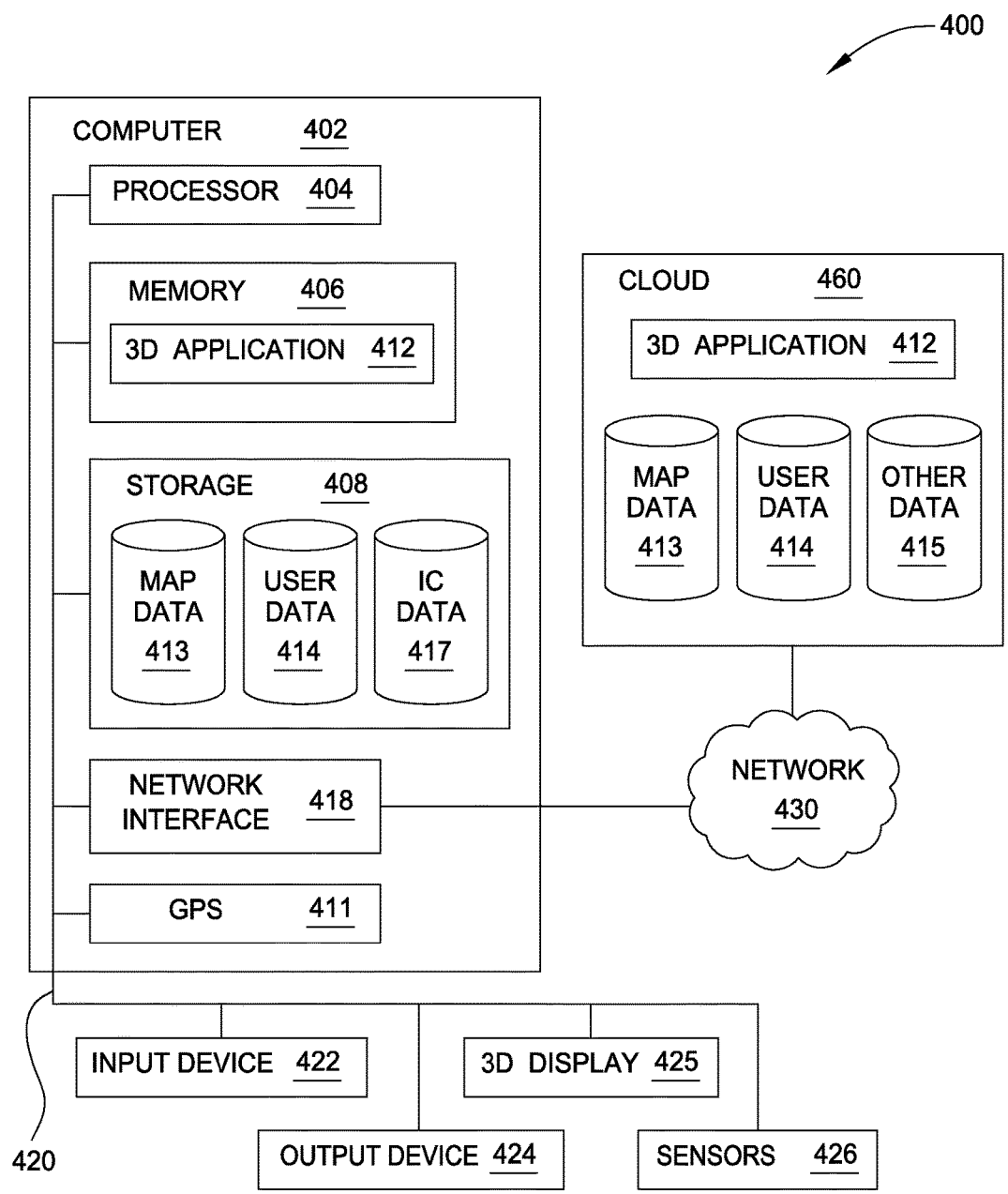
FIG. 4 illustrates a system configured to generate a virtual three-dimensional instrument cluster and three-dimensional navigation system to a user of a vehicle, according to various embodiments of the present invention.

FIG. 4 illustrates a system 400 to generate a virtual three-dimensional instrument cluster including elements 210-214 and three-dimensional navigation system 105 for display to a user of a vehicle, according to one embodiment. In one embodiment, the computer 402 is in a vehicle, such as a car, truck, bus, or van. The vehicle may be equipped with one or more information delivery systems (also referred to as an in-vehicle infotainment (IVI) system). The computer 402 may also be connected to other computers via a network 430. In general, the network 430 may be a telecommunications network and/or a wide area network (WAN). In a particular embodiment, the network 430 is the Internet. As shown, the network 430 facilitates communication between the computer 402 and a cloud computing environment 460.

The computer 402 generally includes a processor 404 connected via a bus 420 to a memory 406, a network interface device 418, a storage 408, an input device 422, and an output device 424. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is included to be representative of a single CPU, multiple CPUs, a single CPU having multiple processing cores, and the like. The network interface device 418 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives, SAN storage, NAS storage, removable memory cards or optical storage. The memory 406 and the storage 408 may be part of one virtual address space spanning multiple primary and secondary storage devices.

The input device 422 may be any device for providing input to the computer 402. For example, a keyboard and/or a mouse may be used. The output device 424 may be any device for providing output to a user of the computer 402. For example, and without limitation, the output device 424 may be any conventional display screen or set of speakers. Although shown separately from the input device 422, the output device 424 and input device 422 may be combined. For example, and without limitation, a display screen with an integrated touch-screen may be used. The global positioning system (GPS) 411 is a module configured to track the location of the vehicle using GPS technology. Although a GPS system is described, any suitable system for navigation may be used, which may include, without limitation, global navigation satellite system (GNSS), GLOSNASS, Galileo, cell tower signals, Wi-Fi signals, radio signals, TV signals, and data which comes from dead reckoning.

As shown, the memory 406 contains the 3D application 412, which is an application generally configured to generate and output a stereoscopic three-dimensional rendering of a navigation system and an instrument control panel on the 3D display 425 of a vehicle. One example of the 3D application includes, without limitation, the Unity 3D framework by Unity Technologies. The 3D application 412 is further configured to continuously modify, when necessary, the 3D output displayed on the 3D display 425. For example, and without limitation, if a user specifies, through one or more input sources 422, that the navigation map should be brought closer to the driver's face, the 3D application 412 may update the output of the 3D display 425 such that the 3D navigation map is closer to the driver's face. The 3D application 412 may modify the output of the 3D display based on any number of other factors as well, including a computed driving context, an event, user preferences, or detecting the user's eye focus. The 3D application 412 may detect the user's eye focus using one or more sensors 426. The sensors 426 may be any type of sensors, including visual or thermal imagers, time-of-flight sensors, infrared and ultrasonic sensors, laser based sensors, and the like. The 3D application 412 may also include computer vision software that is connected to the 3D glasses worn by a user in order to provide scene analysis and head tracking. In some embodiments, the 3D application 412 may harness processing power of devices not part of the system 400, such as smart phones, smart watches, or remote servers (such as in the cloud 460) over a wireless network. The 3D application 412 may also interface with a graphics processing unit (GPU), not pictured, in order to generate the 3D renderings described herein.

As also shown, the storage 408 includes a map data 413, which includes the three-dimensional map data displayed on the 3D display 425. The map data 413 may be three-dimensional third-party map data with depth information used to create a 3D model. The storage 408 also includes user data 414, which may include user preferences and the like. For example, and without limitation, the user data 414 may include entries for different drivers, specifying preferred color schemes, ordering, layer positions, and the like, for each item displayed on the 3D display 425. The 3D application 412 may use preferences in the user data 414 to influence the output it displays on the 3D display 425. The storage 408 also includes the instrument cluster (IC) data 417, which may be a repository of predefined templates for instrument control panels. The IC data 417 may include individual instrument controls, full layers of controls, and multiple layers of controls. The IC data 417 may include different shapes, sizes, and colors of instrument controls. Still yet, the IC data 417 may include predefined coordinates for each display element, including the navigation map and other instrument controls.

The cloud computing environment 460 includes among other resources, the map data 413, user data 414, and other data 415. The other data 415 may include location-specific data, such as speed limits, laws, and other driving regulations. In one embodiment, the other data 415 is also included in the storage 408. The cloud computing environment 460 also includes an instance of the 3D application 412, which may be used to access other information on the Internet when necessary to assist the instance of the 3D application 412 in the computer 102. For example, and without limitation, if the instance 3D application 412 in the computer 102 cannot fully compute the driving context locally, the 3D application 412 in the cloud 460 may access additional data in order to notify the 3D application 412 in the computer 402 how to proceed.

Figure 5:
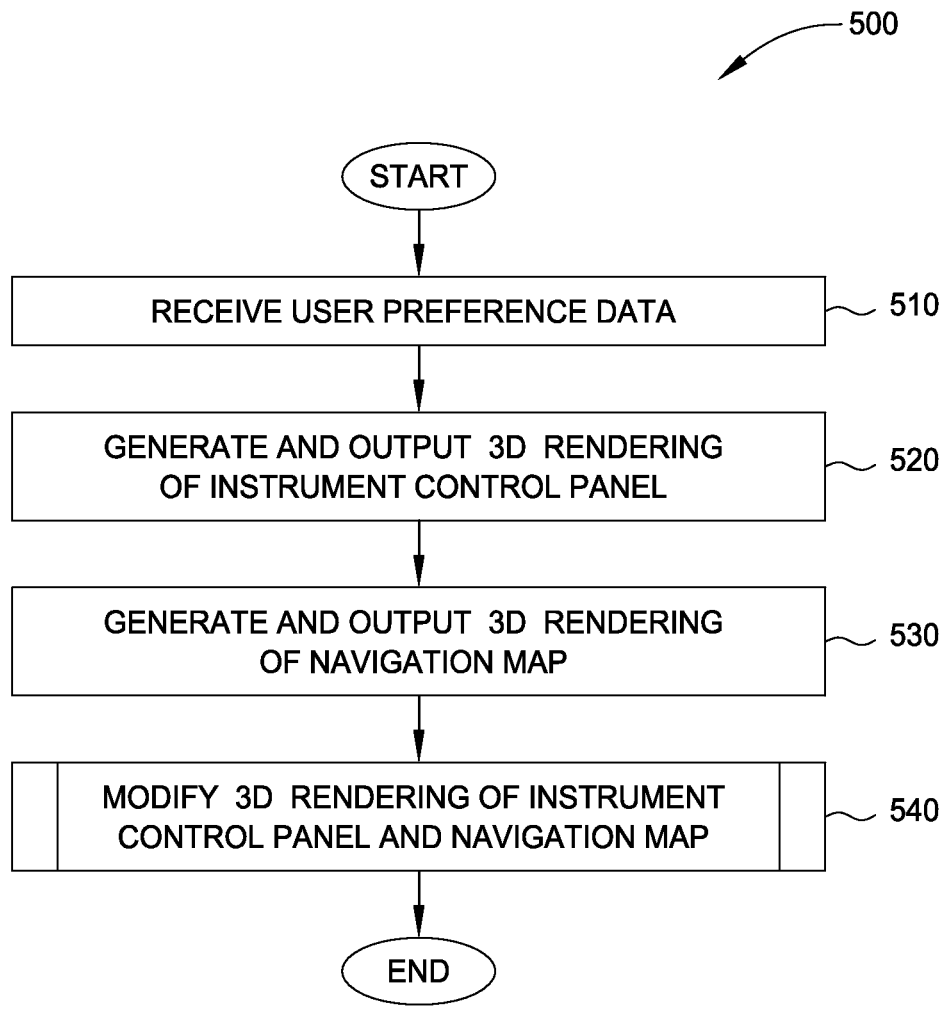
FIG. 5 is a flow diagram of method steps for generating a virtual three-dimensional instrument cluster and three-dimensional navigation system for display to a user of a vehicle, according to various embodiments of the present invention.

FIG. 5 is a flow diagram of method steps for generating a virtual three-dimensional instrument cluster, including, without limitation, elements 210-214 and three-dimensional navigation system 105 for display to a user of a vehicle, according to various embodiments of the present invention. Although the method steps are described with respect to the systems of FIGS. 1-4, persons skilled in the art will understand that any system configured to perform the method steps, in any order, falls within the scope of the present invention.

As shown, a method 500 begins at step 510, where the 3D application 412 executing on processor 404 receives user preference data. The user preference data may include customized settings indicating a user's preferred colors, positions, and other attributes of different display elements outputted for display on the 3D display. For example, and without limitation, a user may prefer that the speedometer and the tachometer be displayed side-by-side in at an approximately equal depth.

At step 520, the 3D application 412 generates and outputs a 3D rendering of the instrument control panel. Generally, the 3D rendering of the instrument control panel may include a speedometer, tachometer, odometer, fuel gauge, and any other instrument that may be displayed on a vehicle instrument control panel. At step 530, the 3D application 412 generates and outputs a 3D rendering of a navigation map that is part of a navigation system installed in the vehicle. The 3D rendering of the navigation map provides depth to houses, buildings, and other structures (natural or manmade) that are in a predefined area. The navigation map may further include roads, highways, and other elements relevant to assist the driver's navigation, such as an indication of the vehicle and the current navigation route. In one embodiment, the 3D rendering of the instrument control panel is displayed closer to the driver, with the 3D rendering of the navigation map appearing further away from the user. In such an embodiment, the instrument control panel is more transparent in order to allow the driver to see through to the map. However, user preferences may specify to place the map nearer to the driver than some (or all) of the elements of the instrument control panel.

At step 540, described in greater detail with reference to FIG. 6, the 3D application 412 modifies the 3D renderings of the instrument control panel and navigation system. The 3D application 412 may modify the 3D renderings of the instrument control panel and navigations system responsive to an event, user input, a driving context, or the focus of the driver's eyes. For example, and without limitation, if the vehicle has a light that no longer works, a new notification for the light may be added to the instrument control panel at a position near to the driver. As another example, and without limitation, as the vehicle's fuel level decreases during the course of operation, the fuel gauge may move from the background to the foreground while becoming brighter and bolder in order to capture the driver's attention. Generally, the 3D application 412 may modify the 3D renderings any number of times while the vehicle is being driven.

Figure 6:
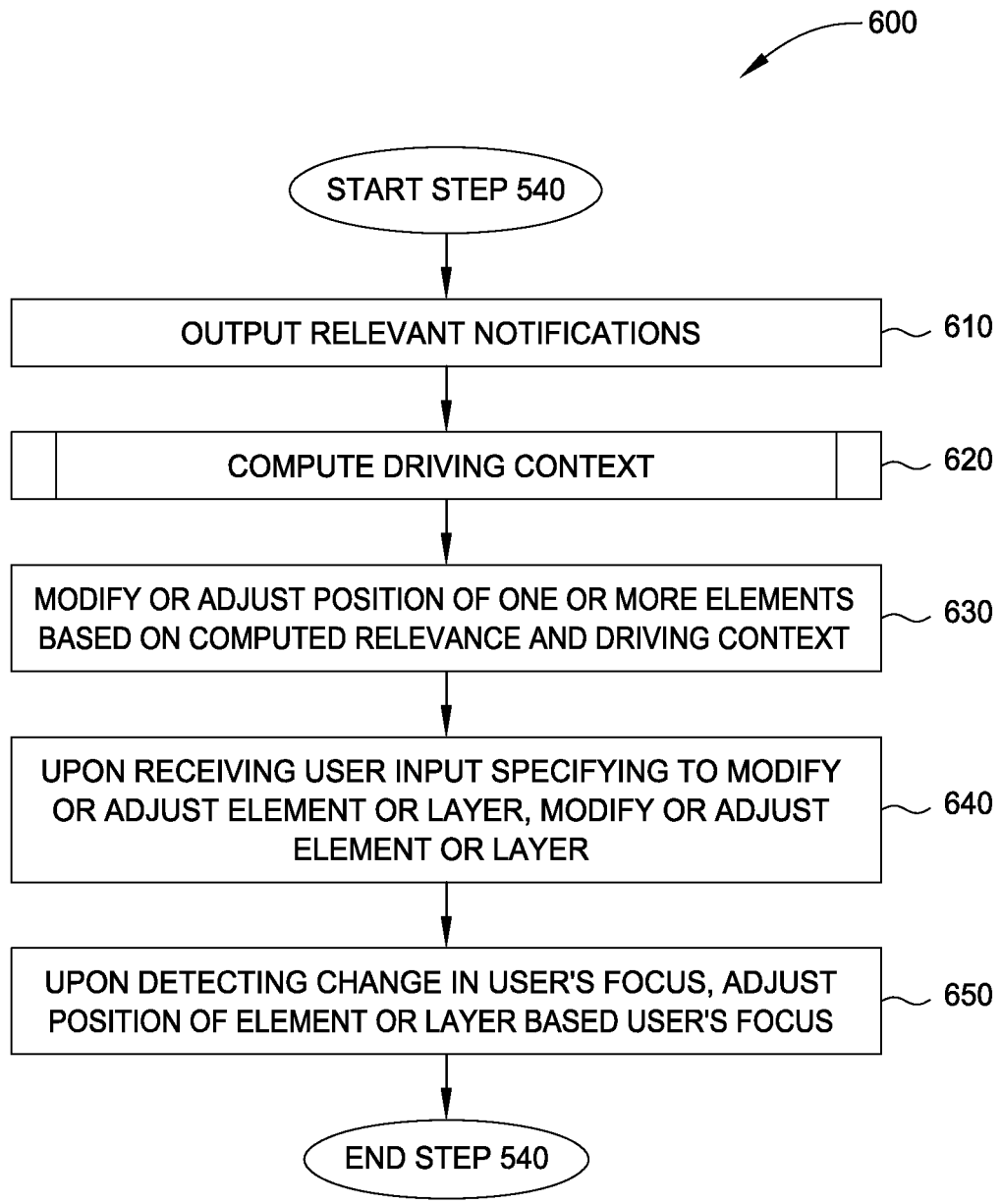
FIG. 6 is a flow diagram of method steps for modifying a virtual three-dimensional instrument cluster and three-dimensional navigation system, according to various embodiments of the present invention.

FIG. 6 is a flow diagram of method steps to modify a virtual three-dimensional instrument cluster including, without limitation, elements 210-214 and three-dimensional navigation system 105, according to various embodiments of the present invention. Although the method steps are described with respect to the systems of FIGS. 1-4, persons skilled in the art will understand that any system configured to perform the method steps, in any order, falls within the scope of the present invention As shown a method 600 begins at step 610, where the 3D application 412 executing on processor 404 outputs relevant notifications to the driver through the 3D display in the vehicle. For example, and without limitation, the notifications can include navigation instructions or other navigation information, notifications regarding the vehicle (such as low tire pressure), or any other type of notification, such as SMS alerts, emails, and the like. At step 620, described in greater detail with reference to FIG. 7, the 3D application 412 computes a current driving context. The driving context may include, but not is limited to, the vehicle's speed, the vehicle's location, an attribute or state of the vehicle (such as gas levels, fluid levels, or tire pressure), applicable laws or regulations at the vehicle's location, weather conditions, triggering events, and the like. For example, and without limitation, the 3D application 412 may use a wireless data connection to determine, based on the vehicle's GPS coordinates, that the speed limit is 65 miles per hour. If the vehicle is traveling at a speed of 85 miles per hour, the driving context may indicate that the driver is speeding. Furthermore, the 3D application 412 may identify that because of the driving context, the speedometer has an increased relevance or importance, and should be adjusted or emphasized in order to catch the driver's attention. The 3D application 412 may compute the driving context periodically, or responsive to detecting some event, such as a blown tire.

At step 630, the 3D application 412 may modify or adjust the position of one or more display elements based on the computed driving context and the relevance of the one or more display elements. The one or more display elements may be at the same or different depths. For example, and without limitation, the entire navigation system may be moved to a different depth, or the speedometer may move from one depth to another depth.

At step 640, the 3D application 412 modifies an element or its position responsive to receiving user input to modify or adjust the position of the element (or an entire layer of elements). The user input may be received from any feasible input source, including, without limitation, a physical wheel controller similar to a dimming controller, a physical slider, a set of buttons, digital settings through a vehicle infotainment system, hand gestures such as waving, wiping, pulling, pushing detected by gesture sensors. Furthermore, the user may literally "grab" an element and move it in any direction. At step 650, the 3D application 412 adjusts the depth of a display element or layer upon detecting a change in the driver's eye focus. For example, and without limitation, if eye-tracking sensors determine that the driver's eyes are focusing on the odometer, which is in a layer farther away from the driver, the 3D application 412 may move the odometer closer to the driver. Additionally, the 3D application 412 may modify the appearance of the odometer to make it easier for the user to see, such as by changing its color, opacity, and size.

Figure 7:
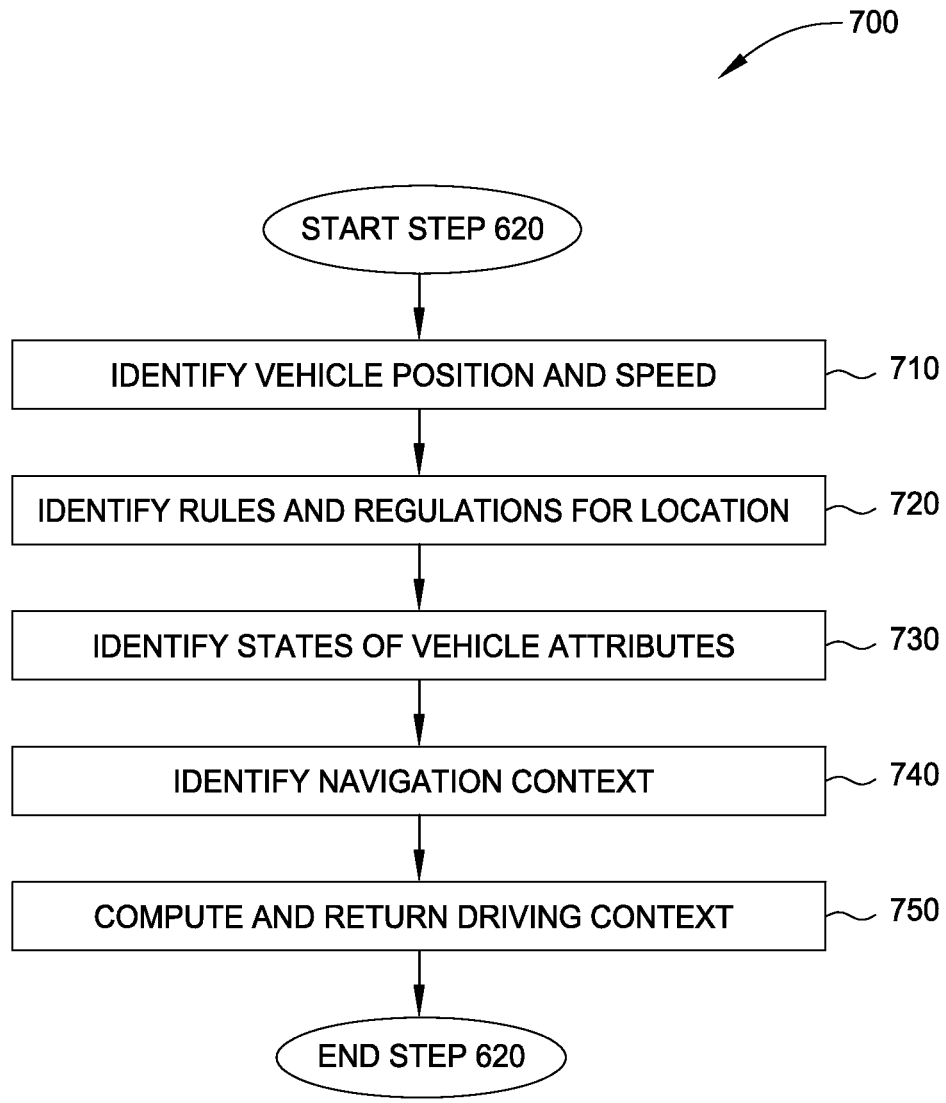
FIG. 7 is a flow diagram of method steps for generating a driving context for a user of a vehicle, according to various embodiments of the present invention.

FIG. 7 is a flow diagram of method steps for generating a driving context for a user of a vehicle, according to various embodiments of the present invention. Although the method steps are described with respect to the systems of FIGS. 1-4, persons skilled in the art will understand that any system configured to perform the method steps, in any order, falls within the scope of the present invention As shown, a method 700 begins step 710, where the 3D application 412 executing on processor 404 identifies the vehicle position using GPS coordinates and the vehicle's speed. At step 720, the 3D application 412 identifies any applicable rules and regulations for the vehicle's current location, such as the speed limit, parking rules, passing rules, and the like. For example, and without limitation, if the vehicle is in a no-passing zone, the 3D application 412 may output a notification indicating that passing other vehicles is not allowed. The rules and regulations may be stored locally in the vehicle, or retrieved from a remote location using a wireless data connection in the vehicle. At step 730, the 3D application 412 identifies the state of one or more vehicle attributes, such as fuel levels, current speed, tire pressure, mileage since last oil change, and the like. For example, and without limitation, if the vehicle has not had an oil change in over 10,000 miles, the 3D application 412 may output a notification to the driver to have the oil changed. At step 740, the 3D application 412 identifies the current navigation context, which includes current and pending navigation system instructions and notifications. For example, and without limitation, the 3D application 412 may determine that there are no navigation instructions for display in the next 10 miles, leaving additional space near the driver that the 3D application 412 can utilize for display elements that are not related to the navigation system. At step 750, the 3D application 412 may compute and return the driving context. The driving context may specify one or more display elements (such as the speedometer, odometer, and the like), layers, or the navigation system as being of high relevance or importance. In response, the 3D application 412 may modify the position or appearance of the identified elements or layers.

In sum, embodiments disclosed herein provide a pseudo-holographic see-through instrument cluster in front of a 3D third-person-view navigation system in a vehicle, and allows a driver (or other user) to adjust the depth position of the instrument cluster, the navigation system, or specific display elements thereof, relative to the surface of the physical display, providing the effect of pushing the objects farther away or pulling it closer to the driver's face. Additionally, the system may programmatically adjust the depth or appearance of any element outputted for display on the 3D display based on a driving context, detecting an event, or detecting a shift in the user's eye focus.

Advantageously, embodiments disclosed herein provide an easier way for drivers to perceive an instrument cluster and navigation system maps, which may reduce the driver's cognitive load. The 3D instrument cluster and navigation maps are given a more realistic look and feel relative to traditional, two-dimensional maps and instrument clusters. The view dependent rendering of the 3D maps also provides an enhanced experience to the driver, as the map is updated according to the driver's current vantage point.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for generating three-dimensional information for display to a user of a vehicle, the method comprising:
generating a three-dimensional representation of a vehicle instrument cluster including a plurality of instruments;
generating a three-dimensional representation of a navigation system map;
outputting for display, on a three-dimensional display in the vehicle, the three-dimensional representation of the vehicle instrument cluster at a first depth level;
outputting for display, on the three-dimensional display, the three-dimensional representation of the navigation system map at a second depth level, wherein the first depth level is closer to a viewing perspective than the second depth level;
determining that the viewing perspective has changed; and
in response to the determining:
moving the three-dimensional representation of the vehicle instrument cluster a first distance, and
moving the three-dimensional representation of the navigation system map a second distance, wherein the first distance is greater than the second distance.

2. The method of claim 1, further comprising moving at least one of a first instrument included in the plurality of instruments and a first element of the three-dimensional representation of the navigation system map to a different depth level.

3. The method of claim 1, further comprising moving at least one of a first instrument included in the plurality of instruments and a first element of the three-dimensional representation of the navigation system map within the first depth level and the second depth level, respectively.

4. The method of claim 1, further comprising moving at least one of the three-dimensional representation of the vehicle instrument cluster and the three-dimensional representation of the navigation system map to a new depth level.

5. The method of claim 1, further comprising modifying at least one of the three-dimensional representation of the vehicle instrument cluster and the three-dimensional representation of the navigation system map in response to at least one of user input, detecting an eye focus of the user, and a computed driving context.

6. The method of claim 5, wherein the driving context comprises at least one of: a current position of the vehicle, a current speed of the vehicle, a navigation task, a state of an attribute of the vehicle, and one or more external conditions.

7. The method of claim 5, wherein modifying comprises at least one of: emphasizing, changing a color of, and changing an opacity of the at least one of the three-dimensional representation of the vehicle instrument cluster and the three-dimensional representation of the navigation system map.

8. The method of claim 1, further comprising:
generating a three-dimensional navigation notification; and
outputting the three-dimensional navigation notification for display at a depth level within a predefined viewing distance of a viewer of the three-dimensional display.

9. A computer-readable storage medium including instructions that, when executed by a processing unit, cause the processing unit to generate three-dimensional information for display to a user of a vehicle, by performing the steps of:
generating a three-dimensional graphical output that includes a three-dimensional representation of a vehicle instrument cluster at a first depth level, and a three-dimensional representation of a navigation system map at a second depth level;
outputting the three-dimensional graphical output for display on a three-dimensional display in the vehicle;
determining that a status associated with at least one of the navigation system map and the vehicle instrument cluster meets a first condition; and
in response to the determining, moving at least one of the three-dimensional representation of the navigation system map and the three-dimensional representation of the vehicle instrument cluster to a third depth level.

10. The computer-readable storage medium of claim 9, further comprising moving at least one of a first instrument included in the plurality of instruments and a first element of the three-dimensional representation of the navigation system map to a different depth level.

11. The computer-readable storage medium of claim 9, further comprising moving at least one of a first instrument included in the plurality of instruments and a first element of the three-dimensional representation of the navigation system map within the first depth level and the second depth level, respectively.

12. The computer-readable storage medium of claim 9, further comprising moving at least one of the three-dimensional representation of the vehicle instrument cluster and the three-dimensional representation of the navigation system map to a new depth level.

13. The computer-readable storage medium of claim 9, further comprising modifying at least one of the three-dimensional representation of the vehicle instrument cluster and the three-dimensional representation of the navigation system map in response to at least one of user input, detecting an eye focus of the user, and the computed driving context.

14. The computer-readable storage medium of claim 13, wherein the driving context comprises at least one of: a current position of the vehicle, a current speed of the vehicle, a navigation task, a state of an attribute of the vehicle, and one or more external conditions.

15. The computer-readable storage medium of claim 13, wherein modifying comprises at least one of: emphasizing, changing a color of, and changing an opacity of the at least one of the three-dimensional representation of the vehicle instrument cluster and the three-dimensional representation of the navigation system map.

16. The computer-readable storage medium of claim 9, further comprising:
generating a three-dimensional navigation notification; and
outputting the three-dimensional navigation notification for display at a depth level within a predefined viewing distance of a viewer of the three-dimensional display.

17. A vehicle-based interactive computing system, comprising:

one or more computer processors configured to:
  generate a three-dimensional graphical output including a three-dimensional representation of a vehicle instrument cluster at a first depth level, and a three-dimensional representation of a navigation system map at a second depth level;
  detect, via one or more sensors, a user eye focus;
  in response to the detecting, move at least one of the three-dimensional representation of the vehicle instrument cluster and the three-dimensional representation of the navigation system map to a third depth level; and
  generate an updated three-dimensional graphical output including the at least one of the three-dimensional representation of the vehicle instrument cluster and the three-dimensional representation of the navigation system map at the third depth level; and
a three dimensional display configured to display the three-dimensional graphical output and the updated three-dimensional graphical output in the vehicle.

18. The system of claim 17, wherein the three-dimensional representation of the vehicle instrument cluster includes a plurality of instruments, the one or more processors further configured to move at least one of a first instrument included in the plurality of instruments and a first element of the three-dimensional representation of the navigation system map to a different depth level.

19. The system of claim 17, wherein the three-dimensional representation of the vehicle instrument cluster includes a plurality of instruments, the one or more processors further configured to move at least one of a first instrument included in the plurality of instruments and a first element of the three-dimensional representation of the navigation system map within the first depth level and the second depth level, respectively.

20. The system of claim 17, the one or more processors further configured to move at least one of the three-dimensional representation of the vehicle instrument cluster and the three-dimensional representation of the navigation system map to a new depth level.

* * * * *